United States Patent [19]
Nishimura

[11] Patent Number: 5,732,049
[45] Date of Patent: Mar. 24, 1998

[54] MAGNETO-OPTICAL RECORDING MEDIUM OF SUPER-RESOLUTION TYPE USING IN-PLANE MAGNETIC LAYER, AND INFORMATION REPRODUCING METHOD USING THE SAME MEDIUM

[75] Inventor: Naoki Nishimura, Tokyo, Japan

[73] Assignee: Canon Kabushiki Kaisha, Tokyo, Japan

[21] Appl. No.: 576,696

[22] Filed: Dec. 21, 1995

[30] Foreign Application Priority Data

Dec. 27, 1994 [JP] Japan ................... 6-324336

[51] Int. Cl.⁶ ..................................... G11B 11/00
[52] U.S. Cl. ............................... 369/13; 428/694 MM
[58] Field of Search .......................... 369/13, 14, 110, 369/116; 360/59, 114; 365/122; 428/694 ML, 694 MT, 694 RE, 694 MM, 694 EC

[56] References Cited

U.S. PATENT DOCUMENTS 5,428,585  6/1995  Hirokane et al. ................. 369/13

FOREIGN PATENT DOCUMENTS

| 586175 | 3/1994 | European Pat. Off. . |
|---|---|---|
| 619577 | 10/1994 | European Pat. Off. . |
| 657880 | 6/1995 | European Pat. Off. . |
| 668586 | 8/1995 | European Pat. Off. . |
| 06-309729 | 11/1904 | Japan . |
| 06124500 | 5/1994 | Japan . |
| 7-254176 | 10/1995 | Japan . |

*Primary Examiner*—Tan Dinh
*Attorney, Agent, or Firm*—Fitzpatrick, Cella, Harper & Scinto

[57] ABSTRACT

A magneto-optical recording medium includes an optically transparent substrate, a first magnetic layer having a compensation temperature between room temperature and a Curie temperature thereof, and a second magnetic layer including a perpendicular magnetic layer. The first magnetic layer is a magnetic film which is located on the side of the substrate with respect to the second magnetic layer and which is an in-plane magnetic layer at room temperature and turns into a perpendicular magnetic layer between room temperature and the Curie temperature of the second magnetic layer. The magnetic film has in-plane anisotropy increasing continuously or stepwise along a direction of a film thickness from the side of the substrate.

7 Claims, 5 Drawing Sheets

MAGNETO-OPTICAL RECORDING MEDIUM OF SUPER-RESOLUTION TYPE USING IN-PLANE MAGNETIC LAYER, AND INFORMATION REPRODUCING METHOD USING THE SAME MEDIUM

BACKGROUND OF THE INVENTION

1. Field of the Invention

The present invention relates to a magneto-optical recording medium used in recording and reproducing information with laser light, and particularly to a magneto-optical recording medium and magneto-optical reproducing method of a super-resolution type enabling the achievement of high-density recording and reproduction.

2. Related Background Art

As a rewritable high-density recording method, attention is being drawn to a magneto-optical recording medium in which information is recorded by writing magnetic domains in a magnetic thin film, using the thermal energy of a semiconductor laser and from which the information is read out using the magneto-optical effect.

Recently, demands have been increasing to raise the recording density of the magneto-optical recording medium so as to produce a larger-capacity recording medium. The linear recording density of an optical disk, such as a magneto-optical recording medium, greatly depends upon the laser wavelength % of a reproducing optical system and the numerical aperture NA of an objective lens. Namely, because the size of the beam width is determined once the wavelength of reproducing light and the numerical aperture of objective lens are determined, the shortest mark length as a reproducible limit becomes approximately about $\lambda/2NA$. On the other hand, the track density is limited mainly by crosstalk between adjacent tracks, and it is also dependent upon the spot size of a reproducing beam as the shortest mark length is.

Therefore, in order to realize a higher-density arrangement for conventional optical disks, it is necessary to decrease the laser wavelength of the reproducing optical system or to increase the numerical aperture NA of the objective lens. It is, however, not easy to decrease the wavelength of the laser because of a drop in efficiency and heat generation. Further, an increase in the numerical aperture of the objective lens makes machining of the lens difficult, and causes a mechanical problem, for example, the collision of the lens with the disk because of a too short distance between the lens and the disk. Under such circumstances, there is a need to develop the technology for improving the recording density by improving the structure of the recording medium or the reading method.

As for this technology, the present inventor made an attempt to produce a magneto-optical recording medium that can realize magnetic super resolution without the application of a reproduction magnetic field and a reproducing method reproducing information from a magneto-optical recording medium using the same medium.

For example, the present inventor proposed the medium structure as shown in FIGS. 1A–1C and a super-resolution technique for realizing a recording density over the optical resolution of reproducing light in a magneto-optical recording medium and an information reproducing method disclosed in Japanese Laid-open Patent Application No. 6-124500.

FIG. 1A shows a cross section of an optical disk as an example of the super-resolution technique. Arrows in the magnetic layers indicate the directions of the sublattice magnetization of iron group elements in the layers, for example. A memory layer 42 is a film having great perpendicular magnetic anisotropy, for example such as TbFeCo or DyFeCo, and recording information is retained by forming magnetic domains, depending upon whether the magnetic domains in this layer are upward or downward relative to the film surface. A reproduction layer 41 is an in-plane magnetic layer at room temperature, but turns into a perpendicular magnetic layer when the temperature is increased to T1-mask. When the light for reproducing information is projected to the disk having this medium structure from the side of substrate 20, the temperature gradient in the center of a data track becomes as shown in FIG. 1C. Viewing this from the side of substrate 20, there exists an isothermal line of T1-mask in a spot, as shown in FIG. 1B. Then, the reproduction layer 41 remains as an in-plane magnetic layer in portions having a temperature below T1-mask, as described above, and thus, the portions do not contribute to the polar Kerr effect (as forming a front mask 4), whereby recording domains retained in the memory layer 42 become unseen as masked. On the other hand, the reproduction layer 41 turns into a perpendicular magnetic layer in the portion having temperatures over T1-mask, and the directions of magnetization therein become the same as those of recording information in the memory layer because of exchange coupling from the memory layer 42. As a result, the recording domains in the memory layer 42 are transferred only to the portion of a smaller aperture 3 than the size of spot 2, thus realizing super resolution.

Since in these conventional super-resolution methods the front mask 4 in the low-temperature region also extends toward adjacent tracks, an attempt has also been made to improve the track density as well as the linear recording density.

In the magneto-optical recording medium of the super-resolution type in a double layered structure using such an in-plane magnetic layer, greater in-plane anisotropy of the in-plane magnetic layer can adequately mask the magnetic information in the memory layer at room temperature, whereas it, however, becomes difficult to achieve a quick transition from being an in-plane magnetic layer to a perpendicular magnetic layer at the reproduction temperature. Conversely, a smaller in-plane anisotropy can permit a quick transition from being an in-plane magnetic layer to a perpendicular magnetic layer at the reproduction temperature, but it becomes difficult to adequately mask the magnetic information in the memory layer at room temperature. This is because an interfacial magnetic domain wall appearing between the reproduction layer and the memory layer mainly appears on the reproduction layer side, as shown in FIG. 4, that is, because vertical magnetic components according to the magnetic information in the memory layer are formed in portions of the reproduction layer near the memory layer. Accordingly, with a magneto-optical recording medium of the super-resolution type in a the double layered structure using a conventional in-plane magnetic layer, it was not easy to obtain good reproduction signals when recording marks and the track width were made shorter.

Under the above circumstances, the present inventor proposed a magneto-optical recording medium of the super-resolution type having a three layered structure in which an intermediate layer, having greater in-plane anisotropy at room temperature and a lower Curie temperature than the reproduction layer, is provided between the reproduction layer and the memory layer, and a reproducing method using the same medium. Using this medium, the transition of the reproduction layer from an in-plane magnetic layer into a perpendicular magnetic layer became quicker, which thus enabled improvement of its reproduction characteristics. (Japanese Patent Application No. 06-45594). However, while the magneto-optical recording medium of the super resolution type in the three layered structure using the above in-plane magnetic layer improved the transition of the reproduction layer from an in-plane magnetic layer to a perpendicular magnetic layer, the improvement was not enough yet. Accordingly, it was not easy with the above medium to obtain good reproduction signals when the recording marks and the track width were made shorter.

SUMMARY OF THE INVENTION

In view of the above problems, an object of the present invention is to further improve the super-resolution medium of the above in-plane magnetic layer type, whereby magnetic information in the memory layer is perfectly masked at temperatures ranging from room temperature to a high-temperature region in the reproducing beam spot and the transition of the reproduction layer from an in-plane magnetic layer to a vertical magnetic layer is quicker so as to enable good reproduction of the recording information at the high-temperature region of the spot, thereby achieving further characteristic improvements, such as improvements in the linear recording density and the track density.

The above object can be achieved by a magneto-optical recording medium comprising an optically transparent substrate, a first magnetic layer having a compensation temperature between room temperature and a Curie temperature thereof, and a second magnetic layer comprised of a perpendicular magnetic layer, wherein the first magnetic layer is located on the substrate side with respect to the second magnetic layer and wherein the first magnetic layer is a magnetic film which is an in-plane magnetic layer at room temperature and becomes a perpendicular magnetic layer between room temperature and a Curie temperature of the second magnetic layer and wherein the magnetic film has in-plane anisotropy continuously or stepwise increasing in the thickness direction from the substrate side.

Further, the above object can also be achieved by an information reproducing method for projecting a light spot onto the above medium to reproduce information stored in the above second magnetic layer, comprising:

a step of changing the first magnetic layer into a perpendicular magnetic layer at a high-temperature portion in the light spot to magnetically couple the first magnetic layer with the second magnetic layer, thereby transferring the information stored in the second magnetic layer to the first magnetic layer, and keeping the first magnetic layer as an in-plane magnetic layer in a low-temperature portion in the light spot; and a step of reproducing the information using reflected light of the light spot.

BRIEF DESCRIPTION OF THE DRAWINGS

FIGS. 1A–1C are drawings to show an information reproducing method in one form of the magneto-optical recording medium, wherein FIG. 1A is a drawing to show a state of the magnetization directions in the layers, FIG. 1B is a drawing to show a mask region and an aperture region in the light spot on the top surface of the medium, and FIG. 1C is a drawing to show a temperature profile along the track direction;

DETAILED DESCRIPTION OF THE PREFERRED EMBODIMENTS

The magneto-optical recording medium and information reproducing method using the same medium according to the present invention will be explained in detail with reference to the drawings.

Figure 2:
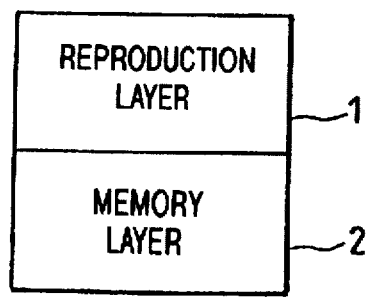
FIG. 2 is a drawing to show a basic layer structure of magnetic layers in the magneto-optical recording medium of the present invention.
Figure 3:
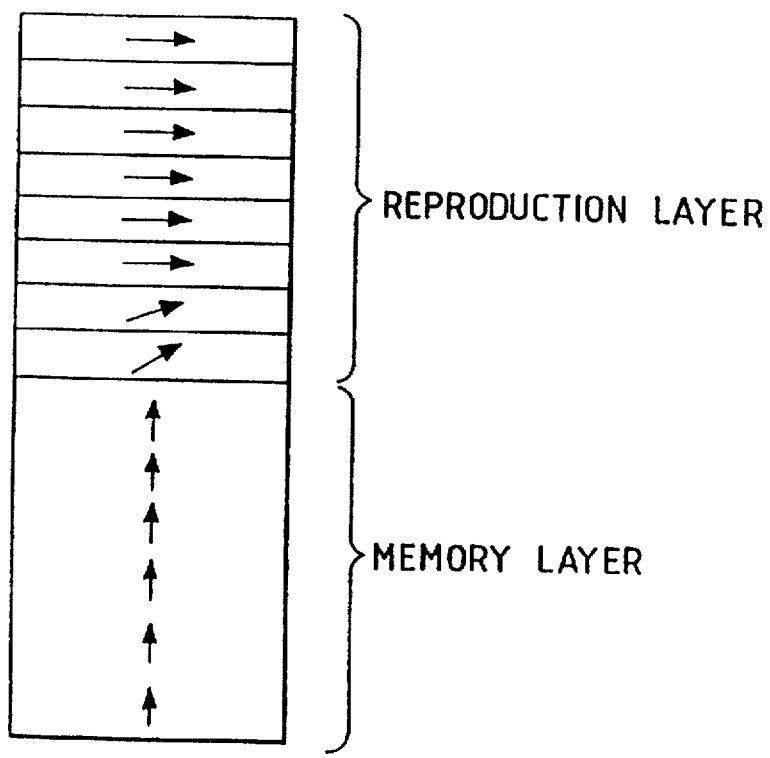
FIG. 3 is a cross section of a magnetic structure of a magneto-optical recording medium of the super-resolution type according to the present invention.
Figure 4:
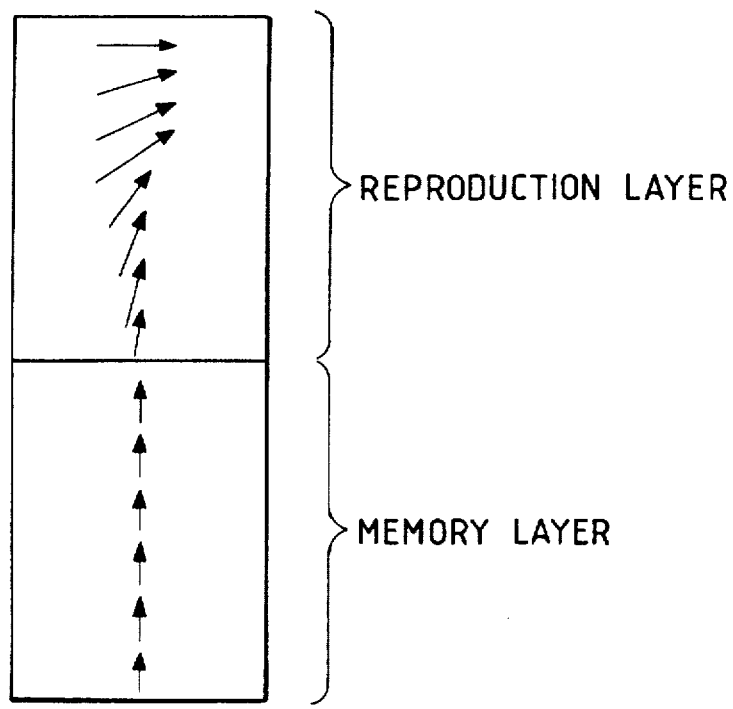
FIG. 4 is a cross section of a magnetic structure of a magneto-optical recording medium of the super-resolution type using the conventional in-plane magnetic layer as the reproduction layer.

The magneto-optical recording medium of the present invention has such a structure that at lest two magnetic layers, a first magnetic layer and a second magnetic layer being a perpendicular magnetic film, are laminated on an optically transparent substrate in order from the substrate side (FIG. 2). Hereinafter, the first magnetic layer will be called a reproduction layer and the second magnetic layer will be called a memory layer.

Figure 5:
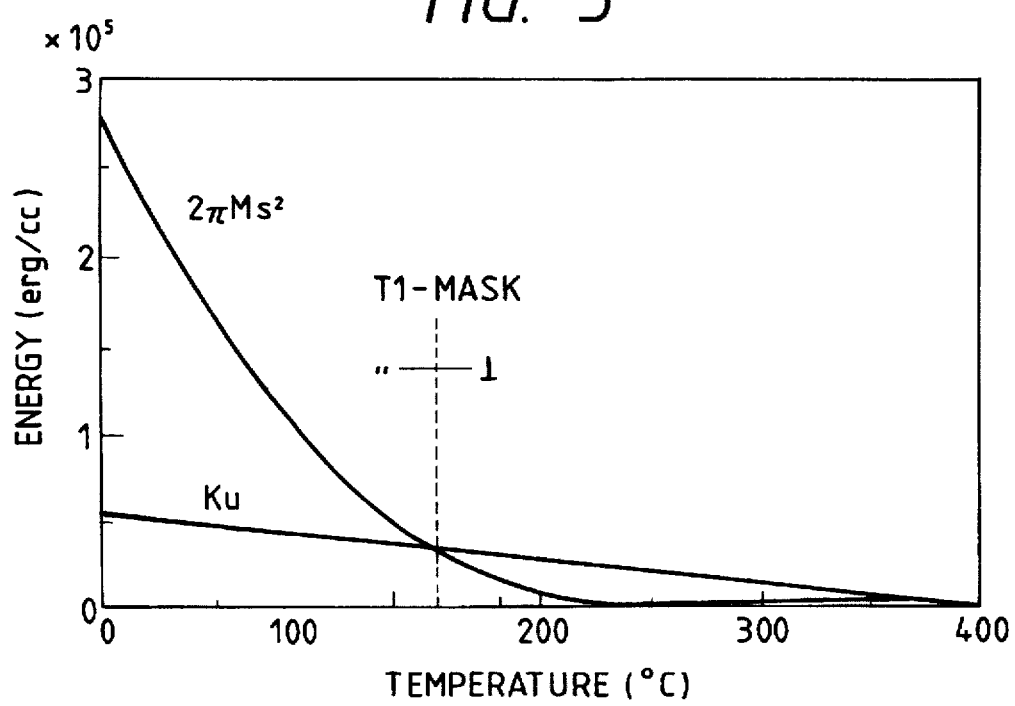
FIG. 5 is a drawing to show an example of the temperature characteristics of demagnetizing energy $2\pi Ms^2$ and perpendicular magnetic anisotropy constant Ku of the reproduction layer in the magneto-optical recording medium of the present invention.

The reproduction layer has such a magnetization mode that the reproduction layer is an in-plane magnetic layer at room temperature and turns into a perpendicular magnetic layer at temperatures between room temperature and the Curie temperature of the memory layer. Then the reproduction layer is arranged so that the in-plane anisotropy at room temperature increases continuously (via a smooth change) or stepwise (via a stepped change) in the thickness direction from the entrance side of light (or from the transparent substrate side). A preferred material for the reproduction layer changing from an in-plane magnetic film into a perpendicular magnetic film is a magnetic film having its compensation temperature between room temperature and the Curie temperature thereof, as shown in FIG. 5. It is because a magnetic film of this type has such a property that saturation magnetization decreases to zero at a temperature higher than the room temperature but lower than the Curie temperature and an intersecting point occurs between the demagnetizing energy and the perpendicular magnetic anisotropy constant, whereby the transition from the in-plane magnetic layer to the perpendicular magnetic layer occurs easier. It is thus to be desired that the reproduction layer have a compensation temperature, for example between room temperature and the Curie temperature and that the magnetic anisotropy be so small as to become smaller than the demagnetizing energy $2\pi Ms^2$ at room temperature.

The reproduction layer in this medium phase in-plane anisotropy increasing continuously or stepwise in the thickness direction from the entrance side of light, and the change of in-plane anisotropy in the thickness direction may be realized by changing the saturation magnetization Ms at room temperature along the thickness direction, for example.

A specific method for the cases where the reproduction layer is made of a rare earth-iron group metal with dominant sublattice magnetization of the rare earth element, is to change the content of the rare earth element in the thickness direction. In this case, the in-plane anisotropy becomes greater with an increase of the content of the rate earth element. In another example, the amount of addition of an element to improve in-plane anisotropy, such as Co, may be changed in the thickness direction so as to give a slope to the perpendicular magnetic anisotropy energy Ku. In this case, the in-plane anisotropy becomes greater as Ku becomes smaller or negative. In still another example, the types of elements may be changed in the thickness direction. For example, supposing rare earth-iron group element alloys are used for the reproduction layer; because the perpendicular magnetic anisotropies of the rare earth-iron group element alloys increase in the order of Gd, Dy, and Tb of rare earth elements contained therein, from the light entrance side of the reproduction layer, for example, layers of GdFeCo, GdDyFeCo, DyFeCo, and DyTbFeCo are laminated in this order to change the types of rare earth elements. In a further example, the in-plane anisotropy of the reproduction layer in the thickness direction may be changed by changing film-forming conditions with the same elements and the same composition.

The reproduction layer is the layer in charge of reproducing the magnetic information retained in the memory layer, which is located closer to the entrance side of light than the memory layer is and which has a higher Curie temperature than that of the memory layer in order to prevent Kerr rotation angles from being degraded upon reproduction. It is also necessary to set the coercive force of the reproduction layer smaller than that of the memory layer. This is for enabling the recording information in the memory layer to be transferred on a stable basis upon reproduction. Specific materials for the reproduction layer may be, for example, rare earth-iron group amorphous alloys, for example, GdFeCo, GdTbFeCo, GdDyFeCo, NdGdFeCo, and DyFeCo. More desired among them are materials mainly containing GdFeCo, which have high Curie temperatures and low coercive forces.

The memory layer is a layer for storing the recording information, which is required to retain magnetic domains on a stable basis. Materials for the memory layer may be those having great perpendicular magnetic anisotropy and capable of stably retaining magnetic states, for example, rare earth-iron group amorphous alloys such as TbFeCo, DyFeCo, and TbDyFeCo, garnet, or platinum group-iron group periodic structure films, for example, Pt/Co, Pd/Co, or platinum group-iron group alloys, for example, PtCo, PdCo.

An element for improving corrosion resistance, such as Al, Ti, Pt, Nb, or Cr, may be added to the reproduction layer or the memory layer. In addition to the above reproduction layer and memory layer, a layer made of a dielectric such as SiNx, AlOx, TaOx, or SiOx may be provided adjacent thereto in order to enhance the interference effect or protection performance. A layer with high thermal conductivity, such as Al, AlTa, AlTi, AlCr, or Cu, may be provided in order to improve thermal conductivity. Another additional layer may be an initialization layer in which magnetization is aligned in one direction for optical modulation overwriting, or an auxiliary layer for recording assist or reproducing assist to adjust the exchange coupling force or the magnetostatic coupling force. Further, a protection coating of the above dielectric layer or a polymeric resin may be provided as a protection layer.

Recording and reproducing processes of the present invention are next explained.

First, recording magnetic domains are formed according to data signals in the memory layer of the magneto-optical recording medium of the present invention. The recording method is, for example, a method for once erasing written data and thereafter modulating the laser power as applying a magnetic field in the recording direction. Another recording method is arranged to modulate the laser power while applying an external magnetic field and to overwrite new data over old data. In the case of the light intensity modulation recording of this type, if the intensity of laser light is determined taking the linear velocity of the recording medium into consideration so that only the predetermined region in the light spot may reach temperatures near the Curie temperature of the memory layer, recording magnetic domains can be formed which are of a diameter smaller than the diameter of the light spot, and as a result, signals can be recorded in a period lower than the diffraction limit of light. Alternatively, overwrite recording may be carried out by modulating the external magnetic field while radiating laser light of such power as to raise the temperature thereof. In this case, recording magnetic domains can be formed which are of a diameter smaller than the diameter of the light spot by increasing the modulation speed in accordance with the linear velocity, and as a result, signals can be recorded in a period lower than the diffraction limit of light.

Next described are the medium and reproducing method according to the present invention.

The present invention realizes magnetic super resolution by apparently optically masking a partial region in the light spot by the in-plane magnetic film without applying the external magnetic field. An aperture area is produced when a reproduction layer turns into a perpendicular magnetic layer with an increase of the temperature and the magnetic information in the memory layer is transferred thereto by a magnetic coupling force. Namely, in the mask area, the magnetic information in the memory layer cannot be perfectly masked unless the reproduction layer is sufficiently in a state of the in-plane magnetic layer; whereas, unless the reproduction layer quickly turns into a perpendicular magnetic layer at the transition temperature, the border becomes unclear between the mask and the aperture, thus becoming a cause of noise.

Originally, the transition from an in-plane magnetic layer to a perpendicular magnetic layer occurs quickly when the magnetic layer exists as a single layer, and the reproduction layer can exist as an almost perfect in-plane magnetic layer at low temperatures. However, when it is laminated on the memory layer, the occurrence of the transition becomes slower, and it thus becomes difficult to change it into a perfect in-plane magnetic layer at room temperature. The reason is that portions of the reproduction layer closer to the memory layer are subject to a stronger exchange coupling force from the memory layer in the case of a double layered structure where the reproduction layer is laminated on the memory layer being the perpendicular magnetic layer, so that effective perpendicular magnetic anisotropy becomes greater in those portions. Namely, Ku in (Eq. 1) as detailed below becomes apparently greater due to the exchange force. Further, the magnetic domain wall between the reproduction layer and the memory layer permeates into a smaller anisotropy region in the reproduction layer, and this domain wall gradually spreads toward the light entrance side of the reproduction layer with a rise in temperature.

The magneto-optical recording medium of the present invention is featured in that, improving the conventional medium of the double layered structure, the reproduction layer is arranged so that the in-plane anisotropy may become stronger continuously or stepwise in the thickness direction from the entrance side of light. This arrangement makes the in-plane anisotropy stronger in portions of the reproduction layer close to the memory layer, and those portions become less affected by the perpendicular exchange force from the memory layer. As a result, even if the reproduction layer is laminated with the memory layer, the reproduction layer may have uniform magnetization directions independent of the thickness direction.

Accordingly, the reproduction layer acts as if it is in a state of a single layer which is not laminated with the memory layer, so that the transition from an in-plane magnetic layer to a perpendicular magnetic layer occurs quickly, and it can be changed into a nearly perfect in-plane magnetic layer at low temperatures. Thus, the reproduction layer is a perfect in-plane magnetic layer at room temperature, but turns quickly from an in-plane magnetic layer to a perpendicular magnetic layer with a rise in temperature. This improves the reproduction characteristics of the medium.

For the above medium, the most preferred arrangement is to continuously enhance the in-plane anisotropy in the thickness direction, but it is also acceptable to enhance the in-plane anisotropy stepwise from the viewpoint of control of production. However, the stepwise increase of the in-plane anisotropy is preferably to be realized by a three or more layer structure of the reproduction layer in which magnetic anisotropies thereof are increased stepwise. This is because a two layer structure cannot fully exhibit the effect as described above.

In the magneto-optical recording medium of the present invention, the reproduction layer is the magnetic layer which is an in-plane magnetic layer at room temperature, and turns into a perpendicular magnetic layer at high temperatures. An example of the magnetic layer of this type is explained below. It is generally known, as to the single-layer magnetic film, that the main direction of magnetization is determined by the effective perpendicular magnetic anisotropy constant $K$ defined by the following equation when the saturation magnetization is Ms and the perpendicular magnetic anisotropy energy is Ku.

$$K = Ku - 2\pi Ms^2 \quad (1)$$

Figure 1A:
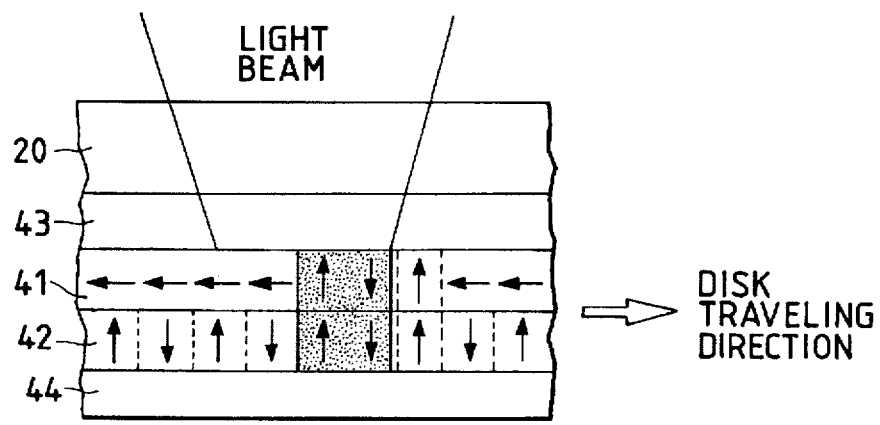
Figure 1B:
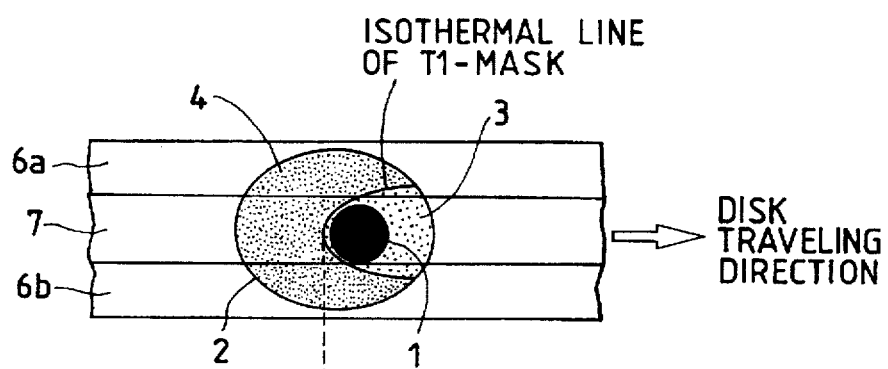
Figure 1C:
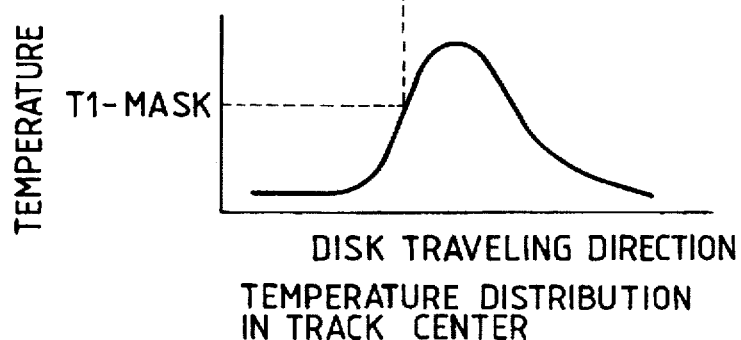

Here, $2\pi Ms^2$ is the demagnetizing energy, and the layer is a perpendicular magnetic film for positive K while an in-plane magnetic film for negative K. Thus, a magnetic layer changing the relation of magnitude between Ku and $2\pi Ms^2$, depending upon the temperature, is effective for making the transition from the in-plane magnetic film to the perpendicular magnetic film, as shown in FIGS. 1A–1C. In the reproduction layer of this type, (Eq. 2) holds in the low-temperature region below the temperature T1-mask before reaching the area for reproducing the magnetic information in the memory layer (the aperture area 3 in FIGS. 1A–1C), and, therefore, that region remains as an in-plane magnetic layer to mask the magnetic information in the memory layer (as a front mask 4, by reference to FIGS. 1A–1C).

$$Ku < 2\pi Ms^2, \quad K < 0 \, (T < T1\text{-mask}) \quad (2)$$

Since Ms becomes smaller with an increase of the medium temperature T, $2\pi Ms^2$ becomes rapidly smaller, thus reversing the relation of magnitude with Ku into the condition of (Eq. 3), whereby the reproduction layer turns into a perpendicular magnetic layer to form the aperture area 3 (see FIGS. 1A–1C).

$$Ku > 2\pi Ms^2, \quad K > 0 \, (T1\text{-mask} < T) \quad (3)$$

Here, it is necessary for the reproduction layer that the in-plane anisotropy thereof be increased, that is, Ki be decreased in the thickness direction from the entrance side of light. A method for realizing it is to continuously increase Ms along the thickness direction from the entrance side of light as in (Eq. 4), or to decrease Ku along the thickness direction from the entrance side of light as in (Eq. 5). An effective method for decreasing Ku is, for example, to increase the Co content. Among them, a method to increase Ms is preferable because the perpendicular magnetic anisotropy can readily be enhanced with a decrease of Ms upon a rise of the temperature, for example, by controlling the compensation temperature. In the case where Ku is decreased, it is relatively difficult to change the reproduction layer into a perpendicular magnetic layer upon a rise in temperature. If Ms is increased in the thickness direction, for example, in the case of use of an RE rich rare earth-iron group alloy (for example, $Gd_x(Fe_{100-y}Co_y)_{100-x}$, etc.), x may be increased in the thickness direction from the entrance side of light as in (Eq. 6).

Figure 6:
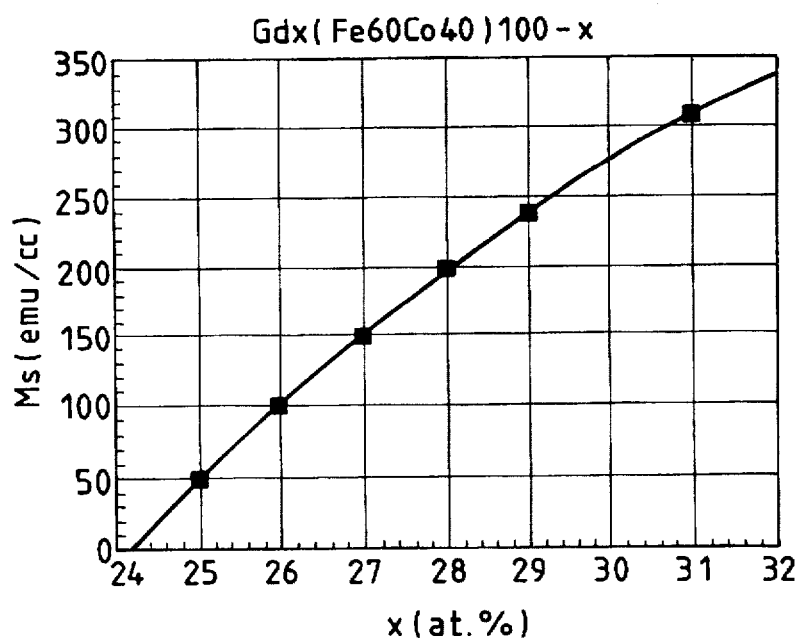
FIG. 6 is a drawing to show the composition dependence of saturation magnetization Ms at room temperature for $Gd_x(Fe_{60}Co_{40})_{100-x}$.
Figure 7:
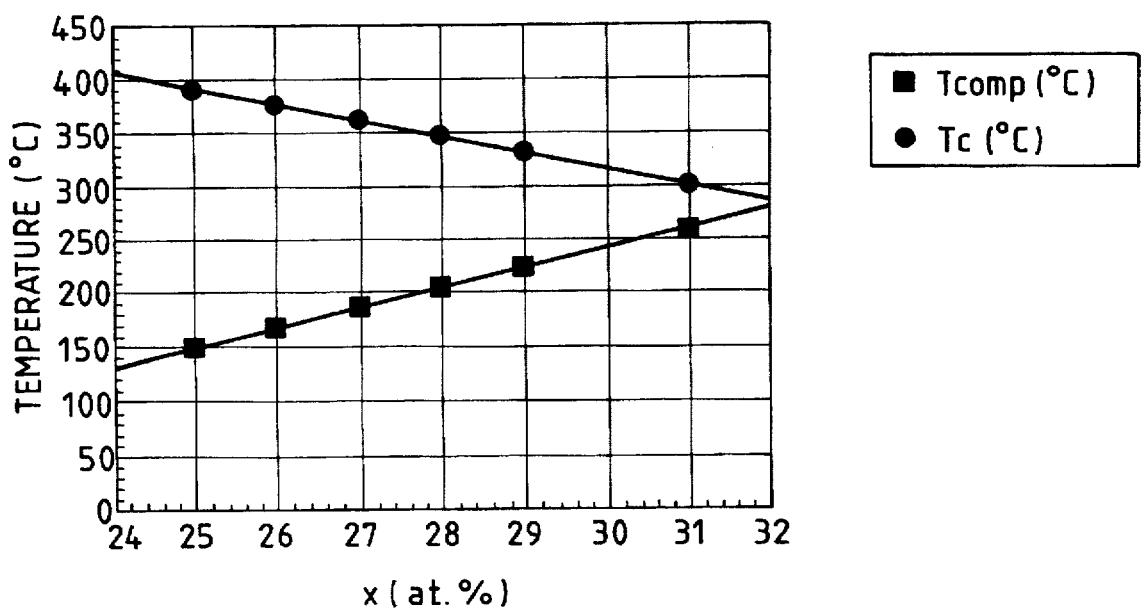
FIG. 7 is a drawing to show the composition dependencies of compensation temperature Tcomp and Curie temperature Tc for $Gd_x(Fe_{60}Co_{40})_{100-x}$.

For the magnetic layer of $Gd_x(Fe_{60}Co_{40})_{100-x}$ as a specific example, FIG. 6 shows the composition dependence of Ms at room temperature and FIG. 7 shows the composition dependencies of the compensation temperature Tcomp and the Curie temperature Tc.

$$Ms1 < Ms2 < Ms3 \quad (4)$$

$$KU1 > Ku2 > Ku3 \quad (5)$$

$$x1 < x2 < x3 \quad (6)$$

Further, specific values of $K_i$ in the thickness direction are determined as follows: on the entrance side of light of the reproduction layer it is preferably between $-6 \times 10^5$ erg/cc and $-5 \times 10^4$ erg/cc both inclusive, and more preferably between $-4 \times 10^5$ erg/cc and $-8 \times 10^5$ erg/cc both inclusive, and more preferably between $-4 \times 10^6$ erg/cc and $-1 \times 10^6$ erg/cc both inclusive.

Further, $K_i$ of the memory layer is preferably not less than $8 \times 10^5$ erg/cc, and more preferably not less than $1 \times 10^6$ erg/cc.

In order to satisfy the above conditions, the saturation magnetizations Ms and compositions are desired to be set to the following values where the reproduction layer and memory layer are made of rare earth metal-iron group metal alloys, for example GdFeCo and TbFeCo.

(1) Ms of reproduction layer

On the entrance of light it is between 100 emu/cc and 300 emu/cc both inclusive, and more preferably between 150 emu/cc and 280 emu/cc both inclusive;

on the memory side it is between 340 emu/cc and 1000 emu/cc both inclusive, and more preferably between 450 emu/cc and 800 emu/cc both inclusive.

(2) Composition of reproduction layer (in units of at %)

In $Gd_x(Fe_{100-y}Co_y)_{100-x}$, on the light entrance side: $24 \leq x \leq 35$, and more preferably $26 \leq x \leq 32$;

on the memory layer side: $38 \leq x \leq 60$, and more preferably $40 \leq x \leq 50$;

as the whole, $20 \leq y \leq 60$.

(3) Ms of memory layer

It is not less than 0 emu, but not more than 300 emu.

(4) Composition of memory layer (in units of at least %)

In $Tb_x(Fe_{100-y}Co_y)_{100-x}$, $15 \leq x \leq 35$, more preferably $18 \leq x \leq 22$;

$10 \leq y \leq 30$.

(5) Curie temperature of reproduction layer

On the light entrance side: not less than 280° C., and more preferably not less than 300° C.; on the memory layer side: between 100° C. and 250° C., and both inclusive, and more preferably between 120° C. and 200° C., both inclusive.

For reproducing data, the laser light is continuously projected toward the medium, and reflected light from the medium is detected. In this case, the temperature of the portion irradiated by the laser increases to form a temperature distribution on the medium in a shape extending in the moving direction of medium, where a part in the light spot is raised to high temperatures. Namely, if the intensity of the laser light upon reproduction is set so that the part of the light spot as shown may reach temperatures above the temperature T1 at which the reproduction layer turns from an in-plane magnetic layer to a perpendicular magnetic layer, such a state is realized that the reproduction layer is a perpendicular magnetic layer (the aperture area) in the part of the light spot and an in-plane magnetic layer (the mask region) in the other portions, as shown in FIGS. 1A–1C. Since the perpendicular magnetic layer in the reproduction layer is magnetically coupled with the memory layer by exchange coupling, signals in the memory layer are transferred to the reproduction layer. Magnetic signals so transferred are converted into optical signals by the magneto-optical effect of the reproduction layer and the optical signals are then detected.

Considering that the area of the high-temperature portion of the light spot shown in the drawing can be determined by the setting intensity of the laser light in this manner, signals recorded in the period below the diffraction limit of light in the memory layer can be transferred in units of recording marks, and as a result, the signals of a period below the diffraction limit of light can be reproduced without inter-symbol interference.

Further, if the temperature distribution is determined so that the temperature Tr at borders between a reproducing track and adjacent tracks upon reproduction satisfy the condition of $Tr < T_1$, signals recorded in memory layers of adjacent tracks are not transferred to reproduction layers thereof, which can stop crosstalk and which can permit an increase in the track density. This state is shown in FIGS. 1A–1C.

If a medium has a relatively large thermal conductivity, the center of the temperature profile approaches the center of the light spot, and the portion near the center of the light spot becomes the aperture area as shown in FIGS. 1A–1C. Crosstalk with adjacent tracks can also be suppressed similarly in this case.

The present invention will be explained in further detail with examples, but it should be noted that the present invention is not intended to be limited to the following examples, but involves all arrangements and modifications within the scope not departing from the essence of the invention.

First, magneto-optical recording media were produced in the form of the reproduction layer being an in-plane magnetic layer at room temperature and becoming a perpendicular magnetic layer between room temperature and the Curie temperature and were evaluated, which are shown in the following Examples 1, 2.

(Example 1)

In a dc magnetron sputtering apparatus, targets of Si, Gd, Tb, Fe, and Co were mounted, a glass substrate and a pre-grooved polycarbonate substrate having the diameter of 130 mm were fixed on a substrate holder set at a distance of 150 mm to the targets, and the inside of the chamber was evacuated by a cryo-pump to a high vacuum of below $1 \times 10^{-5}$ Pa. As the chamber was evacuated, an Ar gas was introduced into the chamber up to 0.4 Pa, and thereafter a SiN interference layer was formed of a thickness of 900 Å, and the reproduction layer of GdFeCo was formed as composition-modified films consisting of a magnetic layer $1_1$ of 100 Å, a magnetic layer $1_2$ of 100 Å, a magnetic layer $1_3$ of 100 Å, and a magnetic layer $1_4$ of 100 Å in this order. Next, the memory layer of TbFeCo and a SiN protection layer were formed in order at a thickness of 350 Å and in the thickness of 700 Å, respectively, thus obtaining the magneto-optical recording medium of the present invention in the structure of FIG. 8. Upon forming each SiN dielectric layer, $N_2$ gas was also introduced in addition to the Ar gas, and the film was formed by reactive sputtering while adjusting a mixture ratio of the gases so as to achieve a refractive index of 2.2.

The composition of the reproduction layer of GdFeCo was as follows.

The magnetic layer $1_1$: $Gd_{26.5}(Fe_{65}Co_{35})_{73.5}$, which was RE rich with an Ms of 130 emu/cc at room temperature and which had a compensation temperature of 160° C. and a Curie temperature of not less than 300° C.

The magnetic layer $1_2$: $Gd_{27}(Fe_{63}Co_{37})_{73}$, which was RE rich with an Ms of 180 emu/cc at room temperature and which had a compensation temperature of 188° C. and a Curie temperature of not less than 300° C.

The magnetic layer $1_3$: $Gd_{28}(Fe_{60}Co_{40})_{72}$, which was RE rich with an Ms of 240 emu/cc at room temperature and which had a compensation temperature of 225° C. and a Curie temperature of not less than 300° C.

The magnetic layer $1_4$: $Gd_{32}(Fe_{58}Co_{42})_{68}$, which was RE rich with an Ms of 340 emu/cc at room temperature and which had a compensation temperature of 270° C. and a Curie temperature of not less than 300° C.

The composition of the memory layer of TbFeCo was $Tb_{20}(Fe_{80}Co_{20})_{80}$, which was TM rich with an Ms of 180 emu/cc at room temperature and which had a Curie temperature of 250° C.

Figure 9:
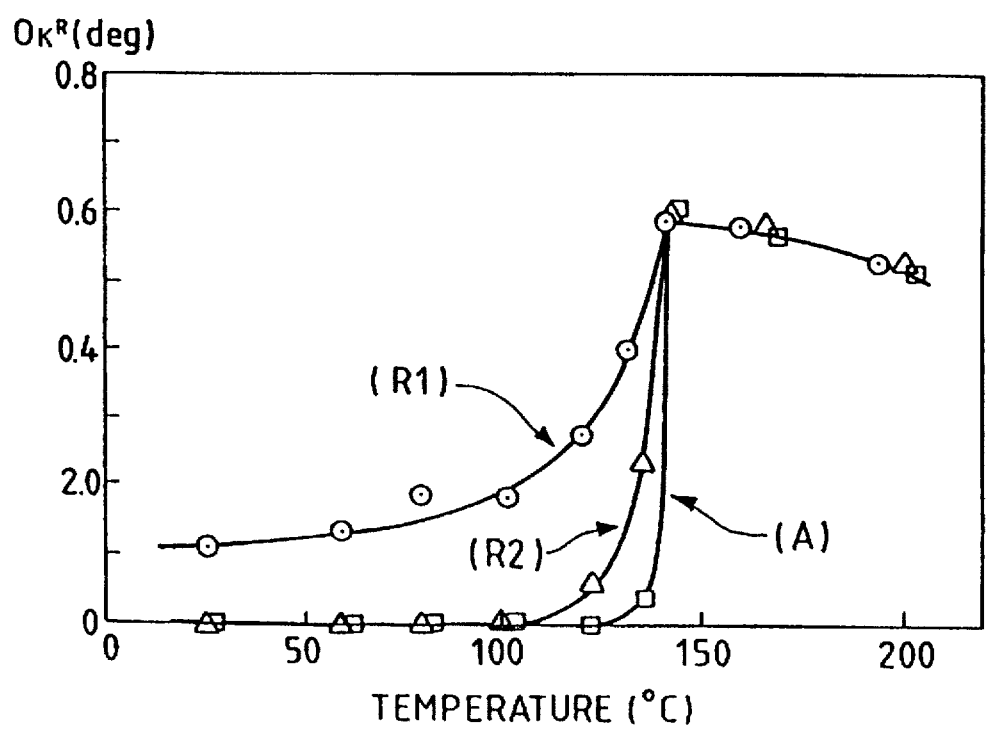
FIG. 9 is a drawing to show the temperature dependence of the residual Kerr rotation angle in Example 1 and Comparative Examples 1, 2.

The sample thus formed by film formation on the glass substrate was irradiated with a semiconductor laser of 830 nm from above the glass substrate, and the applied magnetic field dependence of the Kerr rotation angle was measured. Measurements were carried out as the sample was heated from the room temperature to about 200° C. The temperature dependence of the Kerr rotation angle at the external magnetic field of zero (the residual Kerr rotation angle; $\Theta_K^R$) is shown by a curve of (A) in the graph of FIG. 9. It is seen from this figure that $\Theta_K^R$ is zero from room temperature to approximately 140° C. and that $\Theta_K^R$ becomes suddenly increasing.

Next, magnetic domains were recorded at a mark length of 0.78 μm in this magneto-optical recording medium, and thereafter the magnetic domains were observed with a polarizing microscope under irradiation with a semiconductor laser of 830 nm. It was confirmed that as the laser power increases, the recording magnetic domains contract in the central portion (high-temperature region) of the light spot at a certain laser power, where magnetization was oriented in the erasing direction. Next, using this magneto-optical recording medium, recording and reproduction characteristics were measured. The measurements were carried out so as to achieve the highest C/N ratio by setting the numerical aperture NA of the objective lens to 0.55, the laser wavelength to 780 nm, the recording power in the range of 7 to 13 mW, and the reproducing power in the range of 2.5 to 3.5 mW. The linear velocity was 9 m/s. After the entire surface of the medium was erased at the beginning, carrier signals of 5.8, 10, and 15 MHz (corresponding to mark lengths of 0.78 µm, 0.40 µm, and 0.30 µm, respectively) were recorded in the memory layer, and the mark length dependence of the C/N ratio was checked.

Next conducted was the measurement of crosstalk between adjacent tracks (hereinafter referred to as crosstalk). This was expressed as follows. Signals of a mark length 0.78 µm were recorded in a land portion by the above method and carrier signals (called C1) were measured. Then tracking was aligned with a groove portion after erasing adjacent to the land portion and carrier signals (called C2) were measured in the same manner. A difference (C2−C1) was taken between them to express crosstalk. Namely, experiments were carried out assuming that data was recorded both in lands and grooves, and thus, the effective track pitch was 0.8 µm. The C/N ratio and crosstalk both were measured without applying an initialization magnetic field or a reproduction magnetic field. The results are shown in Table 1.

(Example 2)

Figure 8:
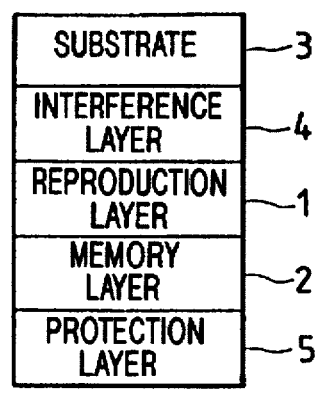
FIG. 8 is a drawing to show an example of the layer structure of the magneto-optical recording medium of the present invention.

Using the same apparatus and the same method as in Example 1, the SiN interference layer was formed at a thickness of 900 Å, the reproduction layer of GdFeCo was formed as composition-modified layers consisting of a magnetic layer $l_1$ of 100 Å, a magnetic layer $l_2$ of 100 Å, and a magnetic layer $l_3$ of 100 Å, and then the memory layer of TbFeCo and the SiN protection layer were formed in order at a thickness of 350 Å and at a thickness of 700 Å, respectively, thus obtaining the magneto-optical recording medium of the present invention in the structure of FIG. 8. Upon forming each SiN dielectric layer, the $N_2$ gas was introduced in addition to the Ar gas, and the film was formed by reactive sputtering so as to achieve a refractive index of 2.2 by controlling the mixture ratio of the gases.

The composition of the reproduction layer of GdFeCo was as follows.

The magnetic layer $l_1$: $Gd_{27}(Fe_{65}Co_{35})_{73}$.

The magnetic layer $l_2$: $(Gd_{50}Dy_{50})_{30}(Fe_{65}Co_{35})_{70}$.

The magnetic layer $l_3$: $Dy_{30}(Fe_{60}Co_{40})_{70}$.

The composition of the memory layer of TbFeCo was $Tb_{20}(Fe_{80}Co_{20})_{80}$, which was TM rich with an Ms of 180 emu/cc at room temperature and which had a Curie temperature of 250° C.

Dynamic characteristics were next evaluated in the same manner as in Example 1. The results are shown in Table 1.

(Example 3)

Using the same apparatus and the same method as in Example 1, the SiN interference layer was formed at a thickness of 900 Å, the reproduction layer of GdFeCo was formed as a continuously composition-modified layer at a thickness of 400 Å by gradually increasing the power supplied to the Gd target so as to gradually increase the Gd content, and then the memory layer of TbFeCo and the SiN protection layer were formed in order at a thickness of 350 Å and at a thickness of 700 Å, respectively, thus obtaining the magneto-optical recording medium of the present invention in the structure of FIG. 8. Upon forming each SiN dielectric layer, the $N_2$ gas was introduced in addition to the Ar gas, and the film was formed by reactive sputtering so as to achieve a refractive index of 2.2 by controlling the mixture ratio of the gases.

In the composition of the reproduction layer of GdFeCo, the magnetic layer 1 was $Gd_x(Fe_{60}Co_{40})_{100-x}$ and x was continuously changed from 27 at % to 32 at % upon film formation.

The composition of the memory layer of TbFeCo was $Tb_{18}(Fe_{88}Co_{12})_{82}$, which was TM rich with an Ms of 120 emu/cc at room temperature and which had the Curie temperature of 220° C.

Dynamic characteristics were next evaluated in the same manner as in Example 1. The results are shown in Table 1.

Comparative examples of magneto-optical recording media of the magnetic super-resolution type were next produced, and they were measured and evaluated by the same apparatus as in the above examples.

(Comparative Example 1)

Next, a medium similar to Examples 2 to 10 as described in the gazette of Japanese Laid-open Patent Application No. 6-124500, was produced and then evaluated. Using the same film-forming apparatus and film-forming method as in Example 1, similarly on a glass substrate, were formed the SiN interference layer at a thickness of 900 Å, the GdFeCo reproduction at a thickness of 400 Å, the TbFeCo memory layer at a thickness of 400 Å, and the SiN protection layer at a thickness of 700 Å in this order, thus obtaining the magneto-optical recording medium of comparative example.

The composition of the GdFeCo reproduction layer was determined as so as to be RE rich with an Ms of 130 emu/cc at room temperature and to have a compensation temperature of 188° C. and a Curie temperature of not less than 300° C.

The composition of the TbFeCo memory layer was determined so as to be TM rich with an Ms of 200 emu/cc at room temperature and to have a Curie temperature of 220° C.

For this magneto-optical recording medium, the temperature dependence of the residual Kerr rotation angle $\Theta_K^R$ was measured in the same manner as in Example 1. The results are shown by a graphic curve (R1) in FIG. 9. Comparing the results with Example 1 (curve (A)), the magneto-optical recording medium of Example 1 is improved in in-plane magnetic anisotropy in the low temperature region near room temperature while maintaining the state of perpendicular magnetic layer at high temperatures.

Next, recording and reproduction characteristics were measured for this magneto-optical recording medium in the same manner as in Example 1, and results are shown in Table 1.

As seen from the above measurement results of Examples 1 to 3, particularly from the measurement results in the short mark lengths, high C/N ratios were obtained in the short mark lengths without applying the reproduction magnetic field with either one of the media. With the media in which the reproduction layer was the in-plane magnetic layer at room temperature and turned into a perpendicular magnetic layer between the room temperature and the Curie temperature, an improvement in crosstalk was observed as well as an improvement of C/N. Comparative Example 1 failed to obtain sufficient C/N.

With the magneto-optical recording media of the present invention, it thus became possible to achieve an improvement in C/N or improvements both in C/N and crosstalk without applying the reproduction magnetic field or with applying neither the initialization magnetic field nor the reproduction magnetic field, and it also became possible to achieve an increase in the linear recording density or increases both in the linear recording density and the track density.

(Comparative Example 2)

Next produced and evaluated was a medium including an intermediate layer to improve the reproduction characteristics. Using the same film-forming machine and film-forming method as in Example 1, the following layers were formed, the SiN interference layer at a thickness of 900 Å, the GdFeCo reproduction layer at a thickness of 400 Å, the GdFe intermediate layer at a thickness of 100 Å, the TbFeCo memory layer at a thickness of 300 Å, and the SiN protection layer at a thickness of 700 Å in that order in the same manner on the glass substrate, thus obtaining the magneto-optical recording medium of Comparative 2.

The composition of the GdFeCo reproduction layer was set so as to be RE rich with an Ms of 160 emu/cc at room temperature and to have a compensation temperature of 205° C. and a Curie temperature of not less than 300° C.

The composition of the GdFe intermediate layer was set so as to be RE rich with an Ms of 450 emu/cc at room temperature and to have a Curie temperature of 205° C. Here, this intermediate layer has no compensation temperature between the room temperature and the Curie temperature.

The composition of the TbFeCo memory layer was set so as to be TM rich with an Ms of 200 emu/cc at room temperature and to have Curie temperature of 220° C.

For this magneto-optical recording medium, the temperature dependence of the residual Kerr rotation angle $\Theta_K^R$ was measured in the same manner as in Example 1. The results are shown by a graphic curve (R2) in FIG. 9. Comparing the results with Example 1 (curve (A)) of the magneto-optical recording medium, it is seen that the medium of Comparative Example 2 is improved as compared with Comparative Example 1 (R1), but is not improved to the level of Example 1, and that the magneto-optical recording medium of the present invention shows the best in-plane anisotropy in the low-temperature region near room temperature and the transition from the in-plane magnetic layer to the perpendicular magnetic layer occurs steeply with the medium of the present invention.

Next, recording and reproduction characteristics were observed with this magneto-optical recording medium in the same manner as in Example 1, and the results are shown in Table 1.

As seen from the above measurement results of Examples 1 to 3, particularly from the measurement results in the short mark lengths, high C/N ratios were obtained in the short mark lengths without applying the reproduction magnetic field with either one of the media. Further, an improvement in crosstalk was observed together with an improvement in C/N for the media in which the reproduction layer was an in-plane magnetic layer at room temperature and turned into a perpendicular magnetic layer between room temperature and the Curie temperature.

TABLE 1

|  | C/N (dB) | | | Crosstalk (dB) |
| --- | --- | --- | --- | --- |
|  | 0.78 μm | 0.40 μm | 0.30 μm | 1.6 μm |
| Example 1 | 48 | 46 | 40 | −40 |
| Example 2 | 48 | 45 | 40 | −42 |
| Example 3 | 49 | 45 | 38 | −45 |
| Comp. Ex. 1 | 48 | 30 | 24 | −29 |
| Comp. Ex. 2 | 48 | 42 | 34 | −36 |

Employing the magneto-optical recording medium and reproducing method according to the present invention, magnetic domains smaller than the diameter of the beam spot can be reproduced using a simple apparatus (conventional apparatus) not necessitating either a reproduction magnetic field or an initialization magnetic field or necessitating neither of them, and the linear recording density or both the linear density and the track density can be greatly improved so as to achieve high density recording.

What is claimed is:

1. A magneto-optical recording medium comprising:
   an optically transparent substrate;
   a first magnetic layer having a compensation temperature between room temperature and a Curie temperature thereof; and
   a second magnetic layer comprised of a perpendicular magnetic layer;
   wherein said first magnetic layer is a magnetic film which is located on the side of said substrate with respect to said second magnetic layer and which is an in-plane magnetic layer at room temperature and turns into a perpendicular magnetic layer between the room temperature and a Curie temperature of the second magnetic layer and wherein said magnetic film has in-plane anisotropy increasing stepwise with at least three steps along a direction of a film thickness from the side of said substrate.

2. The magneto-optical recording medium according to claim 1, wherein said first and second magnetic layers each are made of rare earth-transition metal element amorphous alloys.

3. The magneto-optical recording medium according to claim 2, wherein said first magnetic layer contains GdFeCo.

4. The magneto-optical recording medium according to claim 2, wherein said second magnetic layer contains TbFeCo.

5. The magneto-optical recording medium according to claim 3, wherein, defining $Gd_x(Fe_{100-y}Co_y)_{100-x}$, the first magnetic layer satisfies $24 \leq x \leq 35$ on the side of said substrate and $38 \leq x \leq 60$ on the side of said second magnetic layer.

6. The magneto-optical recording medium according to claim 3, wherein saturation magnetization Ms of said first magnetic layer satisfies 100 emu/cc $\leq$ Ms $\leq$ 300 emu/cc on the side of said substrate and 340 emu/cc $\leq$ Ms $\leq$ 1000 emu/cc on the side of said second magnetic layer.

7. An information reproducing method for projecting a light spot onto a magneto-optical recording medium comprising: an optically transparent substrate; a first magnetic layer having a compensation temperature between room temperature and a Curie temperature thereof; and a second magnetic layer comprised of a perpendicular magnetic layer; wherein the first magnetic layer is a magnetic film which is located on the side of the substrate with respect to the second magnetic layer and which is an in-plane magnetic layer at the room temperature and turns into a perpendicular magnetic layer between the room temperature and a Curie temperature of the second magnetic layer and wherein the magnetic film has in-plane anisotropy increasing stepwise with at least three steps along a direction of a film thickness from the side of the substrate, wherein the light spot is projected onto the medium to reproduce information stored in the second magnetic layer, said method comprising:

- a step of changing the first magnetic layer into the perpendicular magnetic layer in a high-temperature portion inside the light spot so as to magnetically couple the first magnetic layer with the second magnetic layer, thereby transferring the information stored in the second magnetic layer to said first magnetic layer, and maintaining the first magnetic layer as the in-plane magnetic layer in a low-temperature portion inside the light spot; and
- a step of performing reproduction of the information, using reflected light of the light spot.

* * * * *

UNITED STATES PATENT AND TRADEMARK OFFICE
CERTIFICATE OF CORRECTION

PATENT NO. : 5,732,049

DATED : March 24, 1998

INVENTOR(S): NAOKI NISHIMURA

It is certified that error appears in the above-identified patent and that said Letters Patent is hereby corrected as shown below:

COLUMN 1:

Line 28, "%" should read --$\lambda$--.

COLUMN 2:

Line 55, "a" should be deleted.

COLUMN 4:

Line 33, "lest" should read --least--.

COLUMN 5:

Line 12, "rate" should read --rare--.

COLUMN 8:

Line 60, "entrance" should read --entrance side--.

UNITED STATES PATENT AND TRADEMARK OFFICE
CERTIFICATE OF CORRECTION

PATENT NO. : 5,732,049

DATED : March 24, 1998

INVENTOR(S) : NAOKI NISHIMURA

It is certified that error appears in the above-identified patent and that said Letters Patent is hereby corrected as shown below:

COLUMN 12:

Line 42, "as" (first occurrence) should be deleted.

COLUMN 13:

Line 28, "2." should read --Example 2.--.

Signed and Sealed this

Twenty-ninth Day of September, 1998

Attest:

BRUCE LEHMAN

*Attesting Officer*      *Commissioner of Patents and Trademarks*